United States Patent [19]

Torigoe

[11] Patent Number: 4,904,059
[45] Date of Patent: Feb. 27, 1990

[54] LIQUID CRYSTAL DISPLAY ELEMENT HAVING A NONCONDUCTING LAYER OF PARTICULAR INDEX OF REFRACTION

[75] Inventor: Tsunemitsu Torigoe, Iwaki, Japan

[73] Assignee: Alps Electric Co., Ltd., Tokyo, Japan

[21] Appl. No.: 270,702

[22] Filed: Nov. 14, 1988

[30] Foreign Application Priority Data

Feb. 12, 1988 [JP] Japan .................................. 63-28824

[51] Int. Cl.⁴ ............................................... G02F 1/13
[52] U.S. Cl. .............................................. 350/339 R
[58] Field of Search ............... 350/339 R, 341, 347 R, 350/347 V

[56] References Cited

U.S. PATENT DOCUMENTS

| 3,736,047 | 5/1973 | Gelber et al. | 350/339 R X |
| 3,966,305 | 6/1976 | Young | 350/341 |
| 4,248,502 | 2/1981 | Bechteler et al. | 350/339 R X |
| 4,505,547 | 3/1985 | Sekimura | 350/339 R |
| 4,521,079 | 6/1985 | Leenhouts et al. | 350/339 R |
| 4,529,272 | 7/1985 | Kruger et al. | 350/339 R |
| 4,556,288 | 12/1985 | Sekimura | 350/339 R |
| 4,560,240 | 12/1985 | Sekimura | 350/339 R X |
| 4,715,686 | 12/1987 | Iwashita et al. | 350/339 R |
| 4,737,018 | 4/1988 | Iwashita et al. | 350/339 R |

FOREIGN PATENT DOCUMENTS 0007611  1/1983  Japan .................................. 350/339 R Primary Examiner—Stanley D. Miller
Assistant Examiner—Napoleon Thantu
Attorney, Agent, or Firm—Guy W. Shoup; David W. Heid; Stephen L. Malaska

[57] ABSTRACT

A liquid crystal display element of the type having a pair of transparent electrodes consisting of a pair of glass substrates and liquid crystal charged in the space therebetween and which is completely free from a so called "touch", a phenomenon that can destroy the orientation films of the element, is disclosed. According to the invention, a liquid crystal display element of the type as described above is provided with a first insulating film made of a single crystal material having a refractive index greater than that of the transparent electrodes of the glass substrate of the crystal display element. The first insulating film is disposed between one of the transparent electrodes and its corresponding orientation film and a second insulating film made of a single crystal material having a refractive index smaller than that of the transparent electrodes between the other electrode and its corresponding film. The insulating film are so selected that the average value of the refractive index of said first insulating film and that of said second insulating film is substantially equal to the refractive index of the transparent electrodes.

2 Claims, 1 Drawing Sheet

LIQUID CRYSTAL DISPLAY ELEMENT HAVING A NONCONDUCTING LAYER OF PARTICULAR INDEX OF REFRACTION

BACKGROUND OF THE INVENTION

1. Field of the Invention

This invention relates to a liquid crystal display element comprising a pair of transparent electrodes consisting of a pair of glass substrates and liquid crystal charged in the space therebetween.

2. Prior Art

For manufacturing LCDs of TN type, the surface of a glass substrate to be used as a transparent electrode is rubbed to impart the liquid crystal molecules an orientation in a given direction. This rubbing orientation process consists of an operation of rubbing the surface of an orientation film coated on the transparent electrode by using a silk cloth. Through this operation, the longitudinal axis of the liquid crystal molecules are orientated in the rubbing direction.

FIG. 3 of the accompanying drawings is a sectional view of a conventional LCD illustrating the structure of its principal area. In this illustration, the reference numerals 1 and 2 respectively denote an upper substrate and a lower substrate. A pair of transparent electrodes 5 and 6 which are made of ITO films respond to display patterns formed on the opposite (inner) surfaces of substrates 1 and 2 which are respectively coated with undercoats 3 and 4. The reference numerals 7 and 8 respectively denote orientation films made of so many thin dielectric films, of which orientation film 7 covers transparent electrode 5 of upper glass substrate 1 while orientation film 8 covers transparent electrode 6 of lower glass substrate 2. The reference numeral 9 designates liquid crystal charged between upper and lower substrates 1 and 2. Arrangement of the crystal molecules contained in the electrode unit can be controlled by rubbing the surface of said orientation films 7 and 8 in a specific direction in advance to charging crystal liquid 9 therebetween. Said undercoats 3 and 4 have the role of preventing sodium compounds in the glass substrates from contaminating crystal liquid 9.

The rubbing orientation operation entails a drawback of generating static electricity on the surface of orientation film 7 and 8 and therefore, when orientation films 7 and 8 are respectively formed directly on the surface of transparent electrodes 5 and 6 as shown in FIG. 3, the static electricity can be discharged into said transparent electrodes 5 and 6 while they are being rubbed. If a considerable amount of static electricity is discharged into the transparent electrodes, it gives rise to generation of heat within the electrodes, eventually leading to partial destruction of the orientation films and hence faulty orientation.

Moreover, since transparent electrodes 5 and 6 and upper and lower substrates 1 and 2 have refractive indices which are different from each other, the contours of transparent electrodes 5 of a LCD having a configuration as shown in FIG. 3 become visible from outside to obstruct the visibility of the proper display of the LCD particularly when no voltage is applied thereto.

Additionally, when orientation films 7 and 8 are formed directly on transparent electrodes 5 and 6, fine electric conductive particles that have been introduced into the LCD cell during manufacturing can destroy the relatively soft orientation films to short-circuit the upper and lower transparent electrodes 5 and 6, a phenomenon which is often referred to as a "touch" between the upper and lower electrodes.

SUMMARY OF THE INVENTION

It is therefore an object of the present invention to provide a LCD which is free from faulty orientation due to discharge of static electricity, with which the transparent electrodes are not visible from outside when no voltage is applied thereto and which is effectively prevented from occurrence of a "touch" between the upper and lower electrodes.

According to the present invention, the above object and other objects of the present invention can be achieved by providing a first insulating film made of a single crystal material having a refractive index greater than that of the transparent electrodes of the glass substrates of a crystal display element between one of the transparent electrodes and its corresponding orientation films. A second insulating film made of a single crystal material having a refractive index smaller than that of the transparent electrodes must be provided between the other electrode and its corresponding orientation film. The average value of the refractive index of said first insulating film and that of said second insulating film is substantially equal to the refractive index of the transparent electrodes.

By using a first insulating film and a second film whose average refractive index is substantially equal to the refractive index of the transparent electrodes, the contours of the latter which are respectively covered by said insulating films are not visible even when no voltage is applied thereto. Moreover, since these insulating films are made of single crystal materials, they possess an excellent hardness that can effectively prevent a touch from occurring between the upper and lower electrodes. Moreover, the insulating films have an effect of preventing discharge of the static electricity that has been generated on the surface of the orientation films.

Now the present invention will be described in greater detail by referring to the accompanying drawings that illustrate an embodiment of the invention.

DETAILED DESCRIPTION OF THE INVENTION

Figure 1:
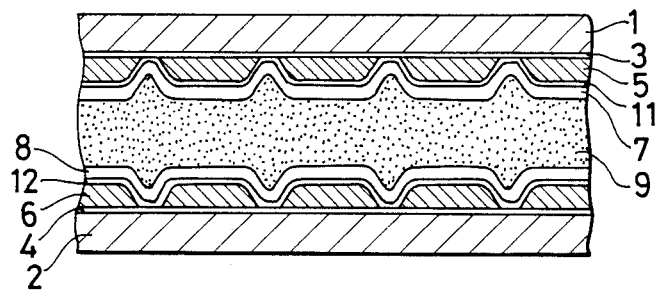
FIG. 1 is a partial sectional view of an embodiment of the LCD according to the present invention, illustrating its principal area.
Figure 3:
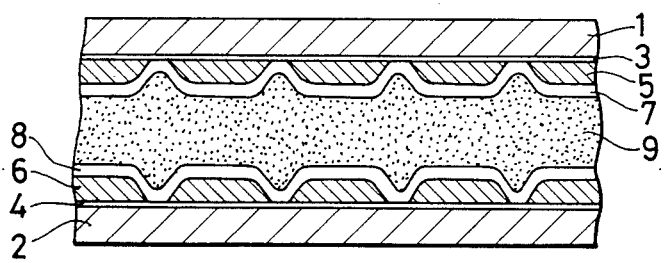
FIG. 3 is a partial sectional view of a conventional LCD.

In FIG. 1, which is a partial sectional view of an embodiment of the LCD according to the present invention, the components having their counterparts in the LCD as shown in FIG. 3 are respectively indicated by the identical reference numerals.

For preparation of a LCD as shown in FIG. 1, transparent electrodes 5 and 6 made of ITO films, to respond to display patterns, are respectively formed on the lower side of upper glass substrate 1 and the upper side of lower glass substrate 2 by respectively interposing undercoats 3 and 4 made of silicon dioxide $SiO_2$, then a first insulating film 11 made of zirconium dioxide $ZrO_2$ and a second insulating film 12 made of silicon dioxide SiO$_2$ are formed by using an offset printing technique to respectively cover transparent electrodes 5 and 6. Thereafter, orientation films 7 and 8 made of thin dielectric films are respectively formed on the surface of said first and second insulating films 11 and 12. After said orientation films 7 and 8 having been subjected to a rubbing operation conducted in a given direction, said upper and lower glass substrates 1 and 2 are put together in such a manner that the transparent electrodes face vis-a-vis to form an integral body, which is then cut into small pieces for forming many LCD cells and liquid crystal 9 is charged between substrates 1 and 2 of each of cells.

First and second insulating films 11 and 12 of a LCD cell prepared in this manner typically have a very reduced thickness between 100 and 200Å and a dielectric resistance greater than 100MΩ/□. First insulating film 11 made of zirconium dioxide ZrO$_2$ has refractive index of 1.96 while second insulating film 12 made of silicon dioxide SiO$_2$ has a refractive index of 1.65, the average of the two indices being 1.80 which is substantially equal to the refractive index of ITO (approximately 1.80). Therefore, the light that comes passing through said first and second films 11 and 12 and the light that comes passing through the ITO film do not show any apparent difference. Hence, with a LCD having first and second insulating films 11 and 12 respectively covering transparent electrodes 5 and 6 as shown in FIG. 1, the contours of transparent electrodes 5 and 6 are not visible from outside particularly when no voltage is applied thereto and the proper visibility of the LCD is significantly enhanced.

Figure 2:
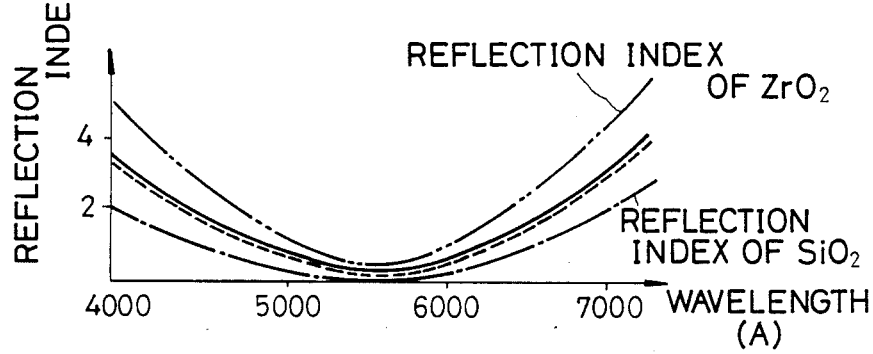
FIG. 2 is a graphic illustration of the relationship of the refractive index of the transparent electrodes and the refractive indices of the insulating films of the LCD as shown in FIG. 1.

FIG. 2 is a graphic illustration of the reflective index of a layered film comprising a zirconium dioxide ZrO$_2$ film and a silicon dioxide SiO$_2$ film (indicated by a solid line), and that of ITO (indicated by a broken line) measured in an experiment to determine the effect of the embodiment and spotted for wavelengths of visible light. As apparent from the illustration, the two reflective indices are substantially identical.

Additionally, since first and second insulating films 11 and 12 are respectively interposed between transparent electrodes 5 and 6 and orientation films 7 and 8 in the above embodiment, the static electricity that has been generated on the surface of orientation films 7 and 8 during a preceding rubbing operation is discharged into air and any discharge of it into transparent electrodes 5 and 6 can be effectively prevented from occurring. Therefore, transparent electrodes 5 and 6 are completely free from any partial destruction that can be caused by the heat produced by such an electric discharge if the insulating films are not present and hence faulty orientation can be effectively prevented.

Moreover, since first and second insulating films 11 and 12 are tightly formed films made of a single crystal material and having an excellent hardness, a reduced thickness between 100 and 200Å can be sufficient for them to effectively prevent a "touch" from occurring due to electric conductive fine particles that have been introduced into the electrode during preparation. Besides, with thin first and second insulating films 11 and 12, any drops of voltage applied to liquid crystal 9 due to the presence of the films will be negligible.

As described above, with a LCD provided with a liquid crystal element according to the present invention, since the average value of the refractive index of first insulating film 11 and that of second film 12 is substantially equal to the refractive index of the transparent electrodes, the contours of the transparent electrodes which are covered by the insulating films are not visible from outside when no voltage is applied thereto, enhancing the proper visibility of the LCD. Moreover, since the insulating films are made of single crystal materials having an excellent hardness, they can be realized to be so thin that any drops of the voltage applied to the liquid crystal of the LCD are practically negligible, while a "touch" between the upper and lower electrodes due to foreign materials introduced thereto can be securely prevented from occurring. It should also be noted that the insulating films effectively prevent any discharge of the static electricity that has been generated on the surface of the orientation films into the transparent electrodes to take place and, therefore, the possibility of occurrence of faulty orientation of the orientation films due to discharge of static electricity during the rubbing operation for orientation is eliminated.

What is claimed is:

1. A liquid crystal display element comprising first and second transparent electrodes supported on first and second glass substrates respectively, first and second orientation films supported in operative relationship with said first and second transparent electrodes, respectively, with liquid crystal charged in a space therebetween, wherein said liquid crystal display element is provided with a first insulating film made of a single crystal material having a refractive index greater than that of the transparent electrodes disposed between one of said first and second transparent electrodes and its corresponding orientation film; and a second insulating film made of a single crystal material having a refractive index smaller than that of the transparent electrodes disposed between the other of said first and second transparent electrodes and its corresponding orientation film, wherein the average value of the refractive index of said first insulating film and that of said second insulating film is substantially equal to the refractive index of the transparent electrodes.

2. A liquid crystal display element according to claim 1, wherein said first insulating film is made of zirconium dioxide ZiO$_2$ and said second insulating film is made of silicon dioxide SiO$_2$.

* * * * *